US008858110B2

United States Patent
Shoup

(10) Patent No.: US 8,858,110 B2
(45) Date of Patent: *Oct. 14, 2014

(54) QUICK CONNECT/DISCONNECT COUPLING FOR A STALK STOMPER

(71) Applicant: Kenneth E. Shoup, Kankakee, IL (US)

(72) Inventor: Kenneth E. Shoup, Kankakee, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/827,625

(22) Filed: Mar. 14, 2013

(65) Prior Publication Data

US 2013/0192857 A1  Aug. 1, 2013

Related U.S. Application Data

(63) Continuation-in-part of application No. 13/493,078, filed on Jun. 11, 2012, now Pat. No. 8,567,167, and a continuation-in-part of application No. 13/135,944, filed on Jul. 19, 2011, now Pat. No. 8,418,432.

(51) Int. Cl.
*F16D 1/08* (2006.01)
*A01B 35/20* (2006.01)
*A01D 75/18* (2006.01)
*A01B 61/04* (2006.01)

(52) U.S. Cl.
CPC .............. *A01B 35/20* (2013.01); *A01D 75/187* (2013.01); *A01B 61/046* (2013.01)
USPC .............................. 403/318; 403/319; 56/17.2

(58) Field of Classification Search
USPC ............ 56/1, 15.8, 17.2, 17.4, 105, 106, 119, 56/193, DIG. 3, DIG. 9; 403/318, 319, 403/322.2
See application file for complete search history.

(56) References Cited

U.S. PATENT DOCUMENTS

| 3,432,183 | A | * | 3/1969 | Groll | 56/17.4 |
|---|---|---|---|---|---|
| 6,626,246 | B2 | * | 9/2003 | Gerber et al. | 172/142 |
| 7,814,737 | B2 | | 10/2010 | Pierson | |
| 2002/0112461 | A1 | | 8/2002 | Burk | |
| 2013/0019581 | A1 | * | 1/2013 | Hyronimus et al. | 56/314 |

OTHER PUBLICATIONS

Jul. 13, 2010 online search—Lankota Group, Inc.—Product Details; http://www.lankota.com/product_details.aspx?LanID-227; Corn Head Stalk Stompers—Shoe Kit; copyright 1998.
Dec. 10, 2010 online search—Planter Pro—AgFocus Official Site—Home; http://www.agfocus.com/; Planter Pro The Direct Planting System; copyright 2010.

(Continued)

*Primary Examiner* — Alicia Torres
(74) *Attorney, Agent, or Firm* — Olson & Cepuritis, Ltd.

(57) ABSTRACT

A quick connect/disconnect coupling for securing an agricultural implement, such as a stalk stomper, to a tool bar assembly on a tractor, without the need for any tools. The tool bar assembly includes a bracket having a pair of spaced-apart arm members. Each arm member has a recess therein, and a hole spaced therefrom. The recesses and the holes are generally transversely aligned. A pin is adapted to be received in the holes. The agricultural implement assembly includes a plate member. Provided on the plate member is a cross bar. The cross bar is adapted to be engaged in the recesses. To connect the agricultural implement assembly to the tool bar assembly, the cross bar is engaged in the recesses and the agricultural implement and the pin can be inserted into the transversely aligned holes to connect the agricultural implement to the tool bar assembly. A spring member biases the implement to pivot away from the plate member.

8 Claims, 6 Drawing Sheets

(56) References Cited

OTHER PUBLICATIONS

Aug. 13, 2010 online search—Lankota Stalk Stomper Farm and Ranch Guide: New Products; http://www.farmandranchguide.com/articles/2009/06/09/new_products/new24.txt; Lankota Stalk Stomper; copyright 2010.

Jun. 21, 2011 online search—Stalk Stompers products, buy Stalk Stompers products from alibaba.com; http://www.alibaba.com/product-free/265616365/Stalk_Stompers.html; Stalk Stompers; copyright 1999-2010.

Jun. 21, 2011 online search—May Wes Stalk Stompers for tractor tire stubble damage protection; http://www.maywes.com/stalk_stompers_tractors; Protect Tractor Tracks and Tires From Stubble Damage With May Wes Tractor Stalk Stompers.

Jul. 13, 2010 online search—May Wes Stalk Stomper for Stubble Damage Protection; http://www.maywes.com/stalk_stompers_combines; Stubble Damage Protection. May Wes Stalk Stomper. Level Corn Stalks Ahead of Combine Tires/Tracks.

* cited by examiner

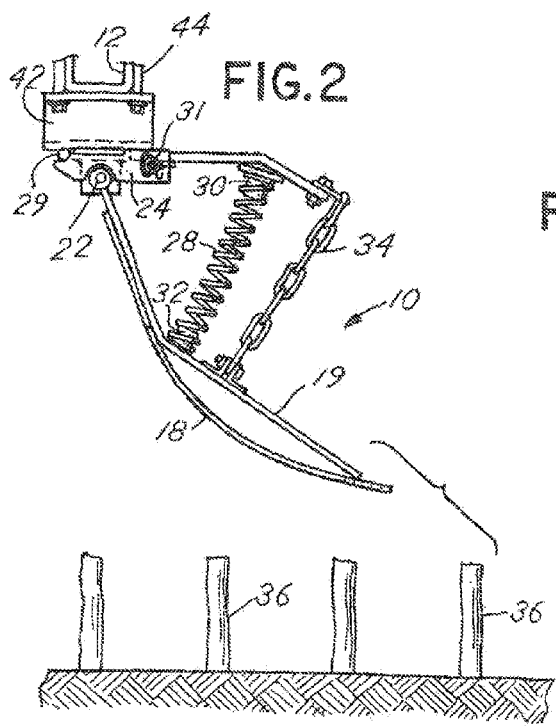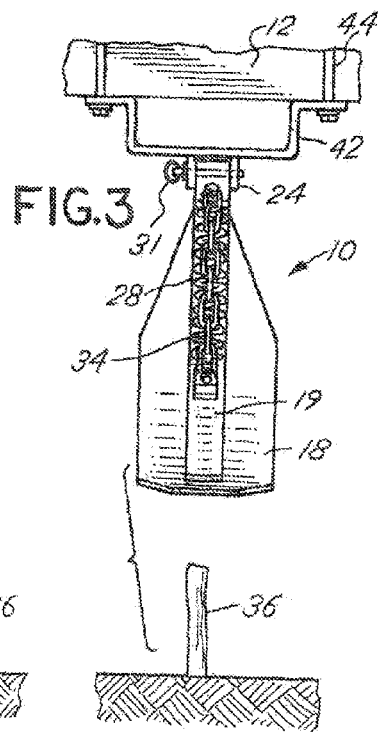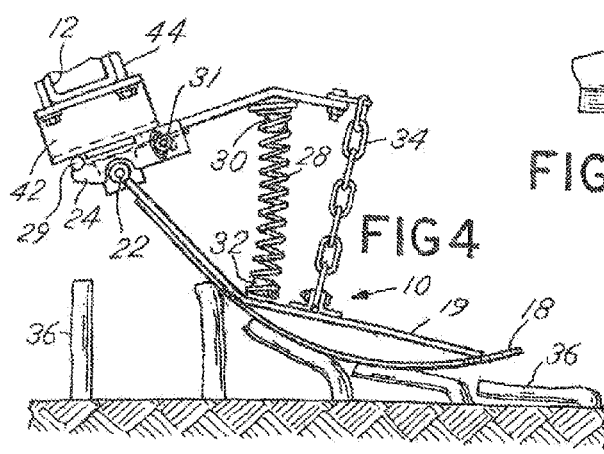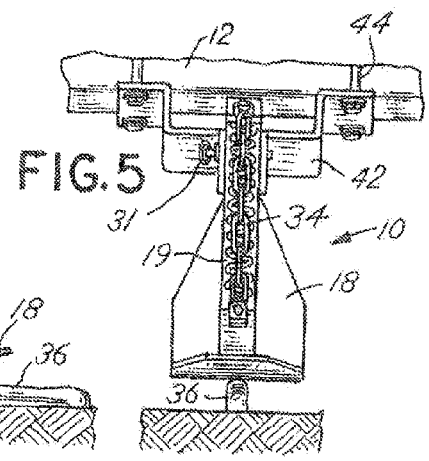

US 8,858,110 B2

QUICK CONNECT/DISCONNECT COUPLING FOR A STALK STOMPER

CROSS REFERENCE TO RELATED APPLICATIONS

This is a continuation-in-part of U.S. patent application Ser. No. 13/493,078, which was filed on Jun. 11, 2012, which is a continuation-in-part of U.S. patent application Ser. No. 13/135,944, which was filed on Jul. 19, 2011. The disclosures of U.S. patent application Ser. No. 13/493,078 and Ser. No. 13/135,944 are hereby incorporated by reference herein.

FIELD OF THE INVENTION

The present invention pertains to a quick connect/disconnect apparatus for securing a farm implement to a tractor or combine, and more particularly, to a quick connect/disconnect apparatus for securing a stalk stomper to a tool bar assembly on the corn head of a combine.

BACKGROUND OF THE INVENTION

Stalk stompers are used to protect the tires of combines and tractors against damage from corn stalks, bean stubble, and the like, while working in the field. The stalk stomper is generally formed from a skid shoe or plate that is adapted to force the stubble to the ground before it has an opportunity to puncture the tire of the tractor or combine when harvesting crops such as corn and soy beans. The skid shoe is secured to a bracket that is in turn affixed to the tool bar of the tractor or combine by a rigid connection that usually includes nut and bolt fasteners. This requires the use of a wrench or like tool. A spring is positioned between an angle plate member or upper plate member and the skid shoe to apply a downward pressure to the skid shoe to force it toward the ground in use. A chain connected between the skid shoe and the angle plate member maintains the spring in assembled position when the tool bar assembly is raised to raise the skid shoe from operating position against the stubble on the ground.

There is a need for a connection apparatus that will enable the stalk stomper to be easily affixed to a tool bar assembly without the need for tools. Thus, an object of the present invention is to provide a quick connect/disconnect apparatus for securing a stalk stomper or like implement to a tool bar assembly on a tractor or combine without the need for tools.

Another object of certain embodiments of the invention is to provide a means by which the angle of the stalk stomper or other implement relative to the tool bar assembly may be easily adjusted without the need for separate tools.

Other objects and advantages of the present invention will be made more apparent hereinafter.

SUMMARY OF THE INVENTION

There has been provided by the present invention a quick connect/disconnect coupling for securing an agricultural implement assembly to a tool bar assembly. In one embodiment, the tool bar assembly includes a bracket having a pair of spaced-apart arm members. Each arm member has a recess therein. The recesses are generally transversely aligned. A pair of holes are also provided in the arm members of the bracket and are spaced longitudinally from the recesses. The pair of holes are generally transversely aligned. A pin is adapted to be received in the holes. The implement assembly includes a plate member having formed thereon a transverse bar or cross bar adapted to be received in the recesses, and a detent such as a retention stop. In certain embodiments, to connect the agricultural implement assembly to the tool bar assembly, the cross bar is engaged in the recesses and the agricultural implement assembly is pivoted so that the plate member is above the pair of holes and the pin can be inserted into the transversely aligned holes to connect the agricultural implement to the tool bar assembly. In this embodiment, the pin will engage the stop member to prevent the transverse bar from disengaging from the recesses in use. The pin may be held in place by way of a cotter pin or the like. To disconnect the agricultural implement assembly from the tool bar assembly, one manually removes the pin from the transversely aligned holes and disengages the transverse bar from the recesses. The assembly/disassembly of the agricultural implement from the tool bar assembly is quick and easy and can be done manually without the need for any tools.

The use of the novel quick connect/disconnect coupling of the present invention for connecting an implement assembly including an implement, such as a stalk stomper or skid shoe, to a tool bar assembly is especially advantageous. The implement is provided with a plate member having a cross bar adapted to be received in the recesses in the depending arm members on the tool bar assembly. In one embodiment retention means in the form of a retention stop are provided on the plate member. To connect the implement assembly including the implement, such as a stalk stomper, to the tool bar assembly, the cross bar is engaged in the recesses and the stalk stomper is pivoted so that the plate member is above the pair of holes and the pin can be inserted into the transversely aligned holes to connect the stalk stomper to the tool bar assembly. The pin will abut the retention stop to prevent the transverse bar from moving longitudinally and disengaging from the recesses when in use. To disconnect the stalk stomper from the tool bar assembly, the pin is removed from the transversely aligned holes and the cross bar is disengaged from the recesses in the depending arm members. The assembly/disassembly of the stalk stomper from the tool bar assembly is quick and easy and can be done manually without the need for any tools.

In some embodiments, it may be desired to provide a means for adjusting the angle of the implement assembly including the stalk stomper relative to the tool bar assembly. In this embodiment, the tool bar assembly may include a bracket having a pair of spaced-apart arm members. Each arm member has a distal end and a recess formed therein. The recesses are generally transversely aligned, and are generally arcuate in shape. A pair of transversely aligned holes are provided in the arm members and spaced longitudinally from the recesses. The stalk stomper implement includes a plate member having formed at a distal end thereof a transverse bar or cross bar adapted to be received in the recesses. The plate member further includes a pair of sidewalls having a plurality of pairs of transversely aligned holes. The plate member and the sidewalls are preferably configured to fit between the arm members. The plurality of transversely aligned holes in the sidewalls are formed along an arcuate path and are of a similar size to the passages formed in the arm members. To connect the agricultural implement to the tool bar assembly the cross bar is engaged in the recesses, and the agricultural implement is pivoted so that the pair of holes in the bracket arm members are aligned with one of the plurality of pairs of holes in the sidewalls. A pin is then inserted into the transversely aligned holes to connect the agricultural implement to the tool bar assembly. The desired angle of the plate member relative to the tool bar assembly may be selected by adjusting the particular pair of holes in the sidewall that are engaged with the holes in the bracket. To disconnect the agricultural implement assembly from the tool bar assembly, one manually removes the pin from the transversely aligned holes and disengages the transverse bar from the recesses. The assembly/disassembly of the agricultural implement from the tool bar assembly is quick and easy and can be done manually without the need for any tools.

In some embodiments, the implement, such as the stalk stomper, is connected to the plate member at a first end by a pivotable connection, such as a pin, bolt, or the like. A second end of the implement is permitted to rotate relative to the plate member. In a preferred form, the second end is urged away from the plate member by way of a spring member or the like. The spring member can take the form of a compression spring, between the plate member and the implement, or a torsion spring connecting the plate member and the implement.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

There is shown in the drawing presently preferred embodiments of the present invention.

FIG. 2 is a side view of a stalk stomper in elevated position with respect to stubble on the ground;

FIG. 3 is a rear view of a stalk stomper in elevated position with respect to stubble on the ground;

FIG. 4 is a side view of a stalk stomper in lowered position engaging and forcing stubble to the ground;

FIG. 5 is a rear view of a stalk stomper in lowered position engaging and forcing stubble to the ground;

Figure 1:
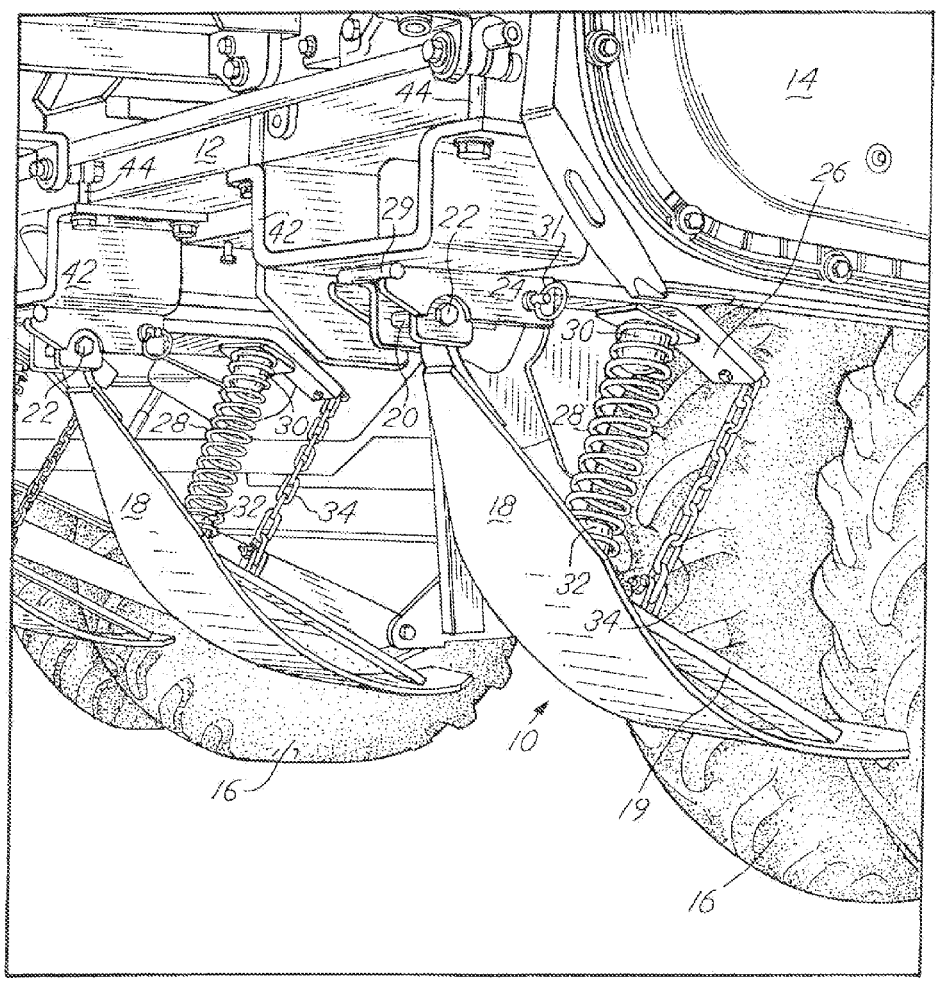
FIG. 1 is a rear perspective view of a tractor showing a pair of stalk stompers affixed to a tool bar by means of the quick connect/disconnect apparatus of the present invention.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the use of the accompanying drawings. In the drawings like numbering represents like elements between the drawings.

DETAILED DESCRIPTION OF THE INVENTION

There is shown in FIG. 1 of the drawing a preferred embodiment of the present invention wherein an implement assembly, including an implement such as a stalk stomper assembly 10, is secured to a tool bar assembly 12 on a combine corn head 14. The combine corn head 14 includes tires 16 mounted on the combine corn head 14 in conventional manner.

The stalk stomper assembly 10 includes a skid shoe 18 secured to a bracket 19 which has a cylindrical housing 20 at one end. The cylindrical housing 20 has a through hole (not shown) for receiving a pivot pin 22 for connecting an end of the skid shoe bracket 19 to the spaced-apart arms 24 depending or extending downward from bracket 26.

A spring member, such as coil spring 28, is secured between a tubular projection 30 affixed to the angled plate member 26 and a tubular projection 32 affixed to the skid shoe bracket 19. Several coils of the upper end of spring 28 overlap and surround the projection 30 and are engaged thereby. Likewise, several coils of the lower end of the spring 28 overlap and surround the projection 32 and are engaged thereby.

As will be explained more fully hereinafter, a transverse member or cross bar 29 on the upper plate member 26 is adapted engage recesses in the arm members 24, and a pin 31 is adapted to be inserted into aligned holes or openings in the arm members 24 for connecting and retaining implement assembly, including the stalk stomper 10, on the tool bar assembly 12. In this embodiment the pin 31 is preferably adapted to engage a detent on the plate member 26 for restricting longitudinal movement and preventing the cross bar from disengaging from the recesses in use. The width of the upper plate member or angled plate member 26 is less than the spacing between the arm members 24 so that the angled plate member 26 will fit between the arm members 24 in assembled relationship.

Figure 6:
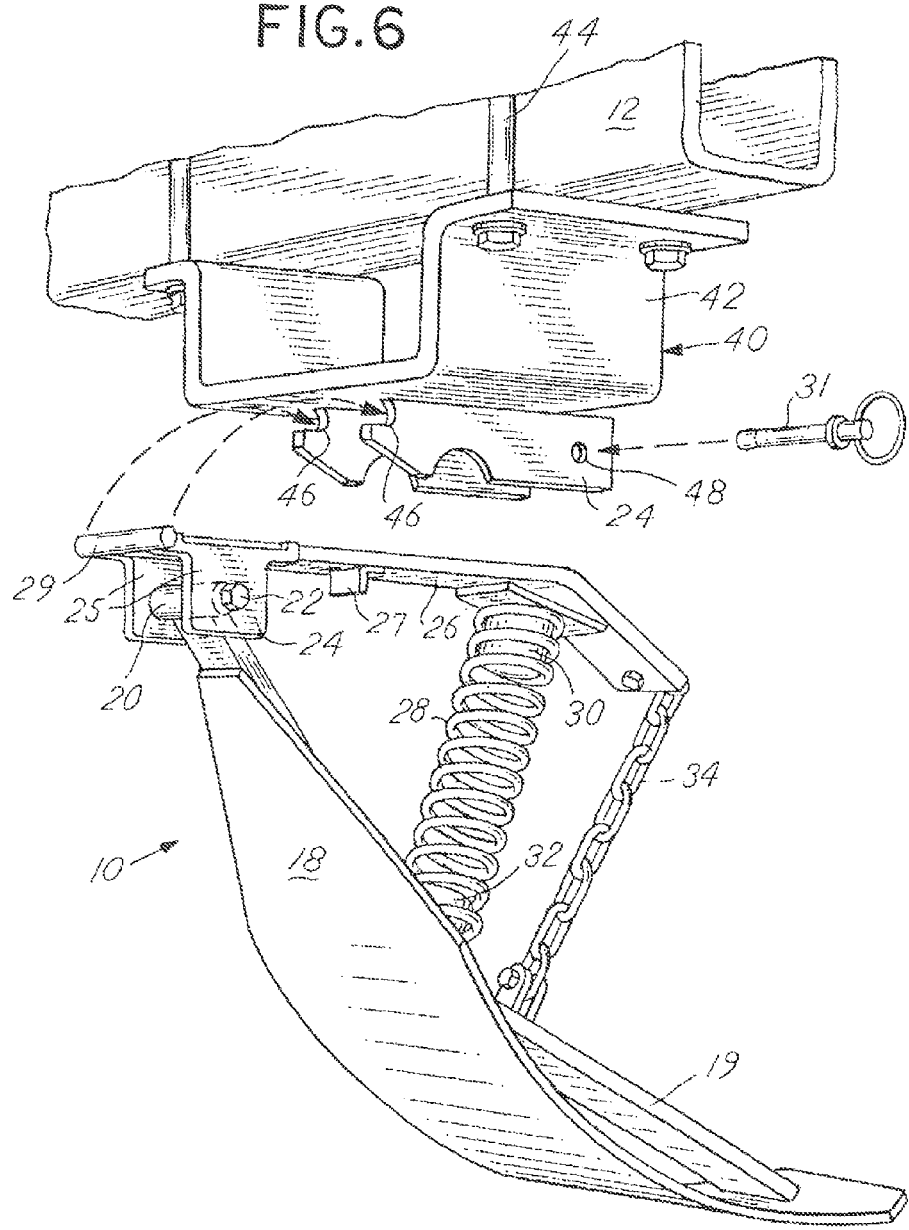
FIG. 6 is an exploded perspective view illustrating the novel quick connect/disconnect connection of a stalk stomper to a tool bar.

Rearwardly of the spring 28 as seen in FIGS. 1 and 6 for example, there is a limiting member, such as chain 34, connected between the angled plate member 26 and the skid shoe bracket 19 for limiting the extent to which the spring 28 can urge rotation of the stalk stomper 10 away from the plate member 26, and maintaining the spring 28 in place on the tubular projections 30 and 32.

As seen in FIGS. 1, 2 and 3, the stalk stomper assembly 10 is in the raised position away from the stubble on the ground, indicated generally by the number 36. The spring 28 is urging the skid shoe 18 downwardly about the pivot pin 22 that connects the front end of the bracket 19 to the depending arms 24 on the tool bar assembly 12. The chain 34 retains the spring 28 in assembled relationship with the projections 30 and 32 when the stalk stomper 10 is in an inoperative position away from the ground.

In FIGS. 4 and 5 there is shown the stalk stomper assembly 10 in the operative position engaging and pressing down upon the stubble 36 so as to prevent damage to the tires 16 of the tractor or combine 14. The stubble 36 tends to pivot the skid shoe 18 counterclockwise as seen in FIGS. 4 and 5 and the spring 28 is compressed to effectively provide a force operating in the opposite direction to push the skid shoe 18 against the stubble 36 to flatten the stubble and prevent tire damage.

With reference to FIG. 6, it is seen that the tool bar assembly 12 includes a tool bar 40 and bracket means 42 secured thereto by suitable fastening means 44, for example, U-bolt and nut fasteners. The spaced-apart arms 24 may be integrally formed with the bracket 42 or suitably connected thereto by welding or other fastening means. As shown, the recesses 46 are formed in the arm members 24 in front of the holes 48. The recesses 46 are transversely aligned and the holes 48 are transversely aligned. Provided on the angled plate member 26 is a detent such as stop member 27. Formed at a distal end of the plate member 26 is a pair of transverse sidewalls 25. A pin 31 is adapted to be inserted into the aligned holes 48 when the stalk stomper 10 is properly positioned with the cross bar 29 in the recesses 46. The thickness of the plate member 26 is less than the spacing between the top of the holes 48 and the bottom of bracket 42 so that with the pin 31 in the holes 48, the plate member 26 is adapted to be secured between the bracket 42 and the pin 31. Further, the rear of the pin 31 will engage the retention block 27 to preclude longitudinal movement of the stalk stomper 10 with respect to the depending arms 24 to prevent the cross bar or transverse bar 29 from disengaging from the recesses 46 in operation.

In summary, to connect the stalk stomper 10 to the tool bar assembly 12, the cross bar 29 is engaged in the recesses 46 and the stalk stomper 10 is pivoted so that the angled plate member 26 of the stalk stomper 10 is above the top of the pair of holes 48 and the pin 31 can be inserted into the transversely aligned holes 48 to connect the stalk stomper 10 to the tool bar assembly 12. Although not shown, a cotter pin can be engaged with the pin 31 when installed to prevent disengagement of pin 31. The pin 31 will engage the retention stop 27 to preclude longitudinal movement of the stalk stomper 10 with respect to the depending arms 24 to prevent the cross bar or transverse bar 29 from disengaging from the recesses 46 in use. Because recesses 46 are generally arcuate in shape, pivoting of the cross bar 29 within the recesses is readily accomplished. The stalk stomper 10 can be disconnected from the tool bar assembly 12 by removing the pin 31 from the transversely aligned holes 48 and removing the cross bar 29 from engagement with the recesses 46 in the depending arms 24. The tasks of connecting and disconnecting the implement, such as the stalk stomper, from the tool bar assembly 12 are accomplished quickly and easily without the necessity for tools.

It will be apparent that the lateral spacing of the skid shoes 18 (FIG. 1) can be adjusted by loosening a fastening means 44 and sliding the associated bracket 42 on the tool bar 12 the desired distance from an adjacent bracket 42 affixed to the tool bar 12. Fastening means 44 can then be tightened in order to secure the associated bracket 42 in position to fix the desired width between adjacent skid shoes 18.

Further, persons skilled in the art will recognize that the upper plate member may be an angled member or a planar member, depending upon application.

While the recesses 46 have been shown in front of the holes 48 in relation to the movement of the tractor, it will be understood that this arrangement can be reversed without departing from the present invention. For example, the holes 48 could be in front of the recesses 46. In such case the stalk stomper could be readily modified to position the cross bar on the plate member spaced from the front thereof, rather than at the front thereof, as shown, for example, in FIG. 6, and the function of such modified device would essentially be the same as that of the disclosed embodiment.

Figure 7:
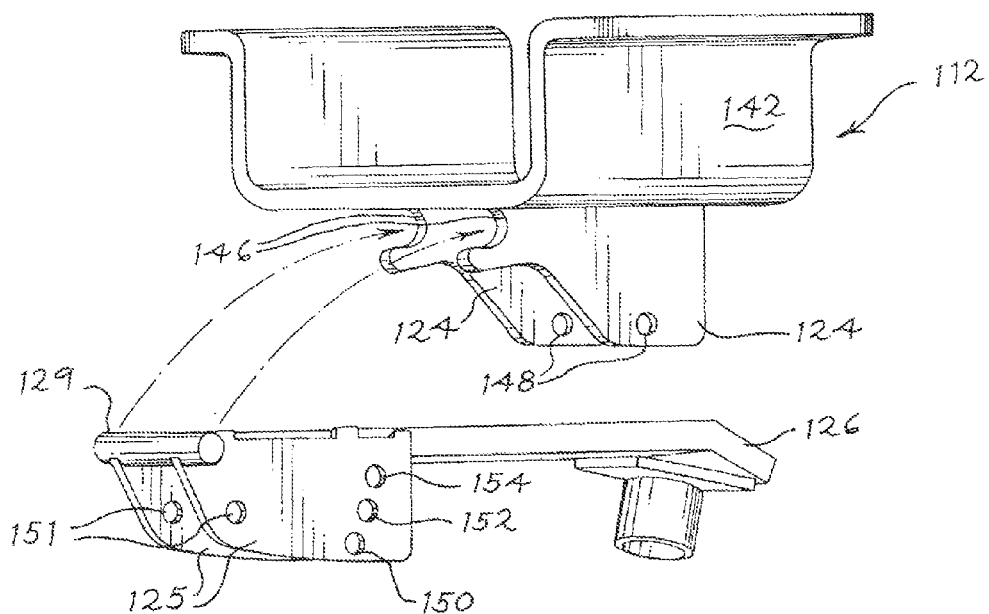
FIG. 7 is an exploded perspective view illustrating an alternate embodiment of the novel quick connect/disconnect connection.
Figure 9:
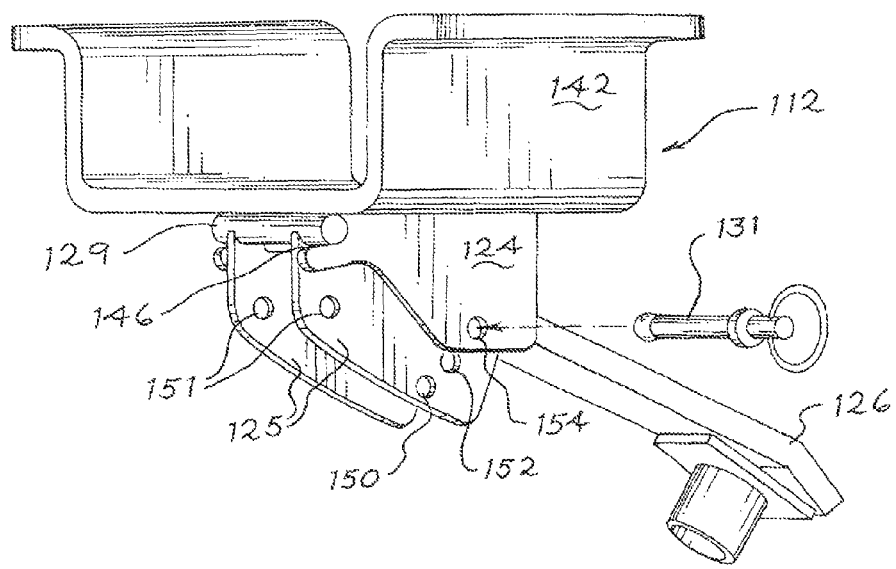
FIG. 9 is a perspective view of assembled portions of the quick connect/disconnect connection.
Figure 8:
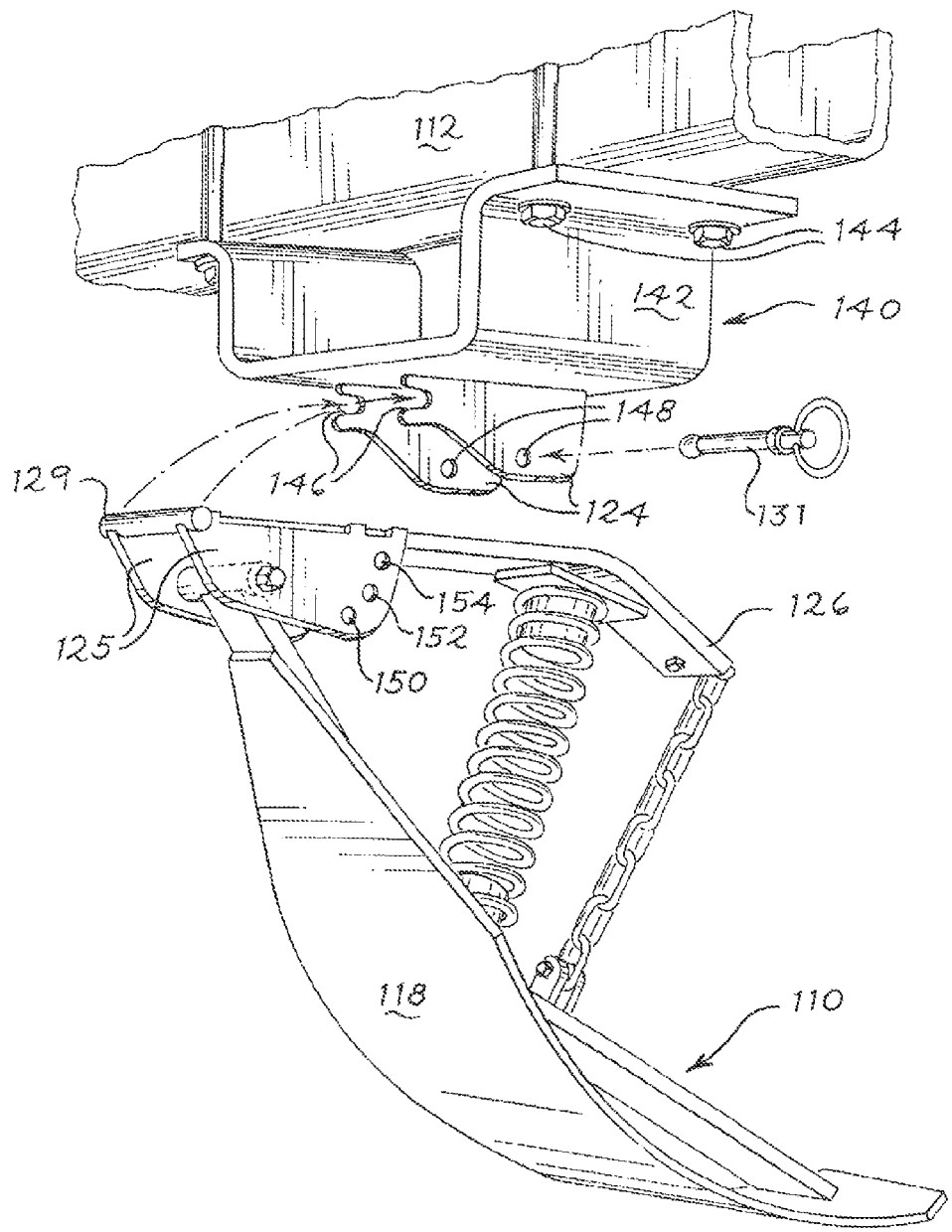
FIG. 8 is a partially assembled perspective view of the alternate embodiment of FIG. 7.

An alternate embodiment of the novel quick connect/disconnect connection of an implement assembly including an implement, such as a stalk stomper, to a tool bar assembly is discussed with respect to FIGS. 7, 8 and 9.

The tool bar assembly 112 includes a tool bar 140 and bracket means 142 secured thereto by suitable fastening means 144, for example, U-bolt and nut fasteners. The spaced-apart arms 124 may be integrally formed with the bracket 142 or suitably connected thereto by welding or other fastening means. As shown, the recesses 146 are formed in the arm members 124 in front of the holes 148. The recesses 146 are transversely aligned and the holes 148 are transversely aligned.

The implement assembly, such as stalk stomper 110, includes an angled plate member 126. Formed at a distal end of the angled plate member 126 is a cross bar member 129 and a pair of sidewall members 125. Cross bar member 129 and sidewall members 125 may be unitarily formed with the plate member 126, or may be integrally joined by way of welding or the like. Sidewall members 125 define a first pair of transverse holes 151 for attachment to skid shoe 118. Such attachment may be done in the same manner as discussed in the previous embodiment, or any other means as would be recognized by persons skilled in the art. Sidewall members 125 further define a plurality of pairs of transverse holes 150, 152, 154 formed along an arcuate path.

When assembled, holes 148 are aligned with any of the pairs of holes 150, 152 or 154. A pin 131 is adapted to be inserted through aligned holes 148 and the pair of holes 151 in the sidewall member 125. As shown in FIG. 9, the pin 131 is passed through holes 148 and holes 150. Cross bar 129 is positioned within recesses 146. Longitudinal movement of the stalk stomper 110 relative to arm members 24 is prevented by a detent in the form of the engagement of the sidewalls 125, the arm members 124 and pin 131. The particular desired angle of the stalk stomper 110 relative to the tool bar assembly 112 may be obtained by selecting from the pairs of holes 150, 152, or 154. Fewer or greater numbers of pairs of holes may be incorporated in the sidewall member as desired. Undesired pivoting of the cross bar 129 relative to the recesses may also be prevented by making the cross bar and recesses of cooperating polygonal shapes. For example, the cross bar and recesses could be hexagonal in cross-section such that relative pivoting is prevented when installed.

In summary, to connect the stalk stomper to the tool bar assembly, the cross bar 129 is engaged in the recesses 146 and the plate member 126 of stalk stomper 110 is pivoted to align holes 148 with the one of the pairs of holes 150, 152 or 154 in the sidewall 125. The pin 131 is inserted when the desired holes are aligned to connect the angled plate member 126 to the tool bar assembly 112. The angled plate member 126 can be disconnected from the tool bar assembly 112 by removing the pin 131 and removing the cross bar 129 from engagement with the recesses 146 in the depending arms 124. The connect and disconnect of the stalk stomper from the tool bar assembly 112 are accomplished quickly and easily without the necessity for tools.

Figure 10:
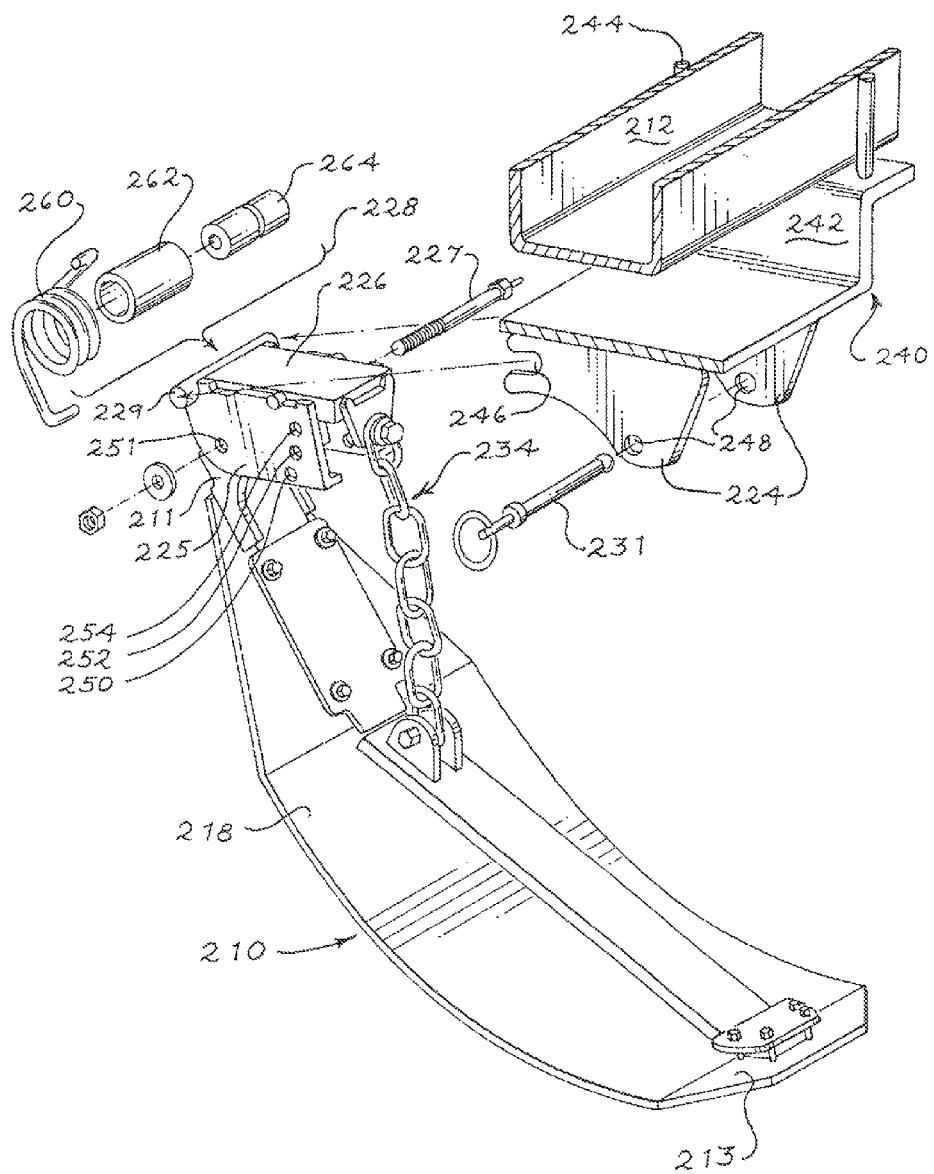
FIG. 10 is a perspective view of an alternative implement assembly.

Referring to FIG. 10, another embodiment is shown. In this embodiment, tool bar assembly 212 (shown partially) includes a tool bar 240 and bracket means 242 (shown partially) secured thereto by suitable fastening means 244, for example, U-bolt and nut fasteners. The spaced-apart arms 224 may be integrally formed with the bracket 242 or suitably connected thereto by welding or other fastening means. As shown, the recesses 246, only one of which is shown, are formed in the arm members 224 in front of the holes 248. The recesses 246 are transversely aligned and the holes 248 are transversely aligned.

The implement assembly, such as stalk stomper 210, includes a plate member 226. Formed at a first end of the plate member 226 is a cross bar member 229 and a pair of sidewall members 225. Cross bar member 229 and sidewall members 225 may be unitarily formed with the plate member 226, or may be integrally joined by way of welding or the like. Sidewall members 225 define a first pair of transverse holes 251 for attachment to skid shoe 218. Such attachment may be done in the same manner as discussed in the previous embodiment, or any other means as would be recognized by persons skilled in the art. Sidewall members 225 further define a plurality of pairs of transverse holes 250, 252, 254 preferably formed along an arcuate path.

When assembled, holes 248 are aligned with any of the pairs of holes 250, 252 or 254. A pin 231 is adapted to be inserted through aligned holes 248 and the pair of holes 251 in the sidewall member 225. The particular desired angle of the stalk stomper 210 relative to the tool bar assembly 212 may be obtained by selecting from the pairs of holes 250, 252, or 254. Fewer or greater numbers of pairs of holes may be incorporated in the sidewall member as desired. Undesired pivoting of the cross bar 229 relative to the recesses may also be prevented by making the cross bar and recesses of cooperating polygonal shapes. For example, the cross bar and recesses could be hexagonal in cross-section such that relative pivoting is prevented when installed.

In this embodiment, a torsion spring assembly 228 connects the plate member 226 and the stalk stomper 210. In a preferred form, torsion spring assembly 228 comprises torsion spring 260, a bushing 262, and a pivot bushing 264. Although not shown in the figures, bushing 262 may be a keyed bushing and may include a notch or other configuration to restrict rotation of the bushing relative to the plate member 226. Stalk stomper 210 is connected at a first end 211 to the sidewalls 225 by way of a bolt, nut and washer assembly 227 (shown in exploded view). The second end 213 of the stalk stomper 210 is vertically movable relative to the plate member 226. Torsion spring assembly 228 (shown in exploded view) is configured to bias the second end 213 away from the plate member 226. The extent to which the second end 213 may be moved away from the plate member 226 may be controlled by a limiting member such as chain 234.

While a presently preferred embodiment of the present invention has been shown and described, it will be apparent that modifications may be made without departing from the scope of the invention as defined in the attached claims.

I claim:

1. A quick connect/disconnect device comprising:
    a tool bar assembly comprising a first arm member and a second arm member, the first and second arm members being in substantially parallel relation to one another, each of the first and second arm members defining a first end with a generally arcuate recess formed therein, the first and second arm members further defining opposing apertures which are longitudinally offset a predetermined distance from the first ends of the first and second arm members;
    an implement assembly comprising:
        a plate member having a first end, a transverse cross bar member operatively connect with the plate member, the cross bar member having first and second end portions configured to engage the arcuate recesses of the first and second arm members;
        sidewall members extending longitudinally from the cross bar member along the plate member, the sidewall members defining a pair of transversely opposed attachment holes for securing with an implement, the sidewall members further defining a plurality of pairs of adjustment holes for adjustable securement with the toot bar assembly; and
    a spring member operatively connecting the plate member and the implement, the implement having a first end and a second end, the first end pivotally secured to the attachment holes, the spring member biased to urge the second end away from the plate member; and
    a pin member adapted to engage the apertures of the tool bar assembly and at least one of the plurality of pairs of adjustment holes of the implement assembly, the relative angle between the tool bar assembly and the implement assembly being determined by the selection of the adjustment holes.

2. The quick connect/disconnect coupling as in claim 1, further including a limiting member to restrict movement of the second end of the implement away from the plate member.

3. The quick connect/disconnect coupling as in claim 1, the spring member being a torsion spring.

4. The quick connect/disconnect coupling as in claim 3, the torsion spring positioned about the first end of the implement.

5. A quick connect/disconnect device comprising:
    a tool bar assembly comprising a pair of substantially parallel arm members, each of the pair of arm members defining a connection recess, the pair of arm members further defining opposing apertures formed longitudinally a predetermined distance from the connection recesses;
    an implement assembly comprising:
        an upper plate member including a transverse cross bar member formed therewith, the cross bar member having first and second end portions configured to engage the connection recesses of the pair of arm members;
        sidewall members extending longitudinally from the cross bar member along the plate member, the sidewall members defining a pair of transversely opposed attachment holes for securing a first end of an implement, the sidewall members further defining a plurality of pairs of adjustment holes for adjustable securement with the tool bar assembly; and
    a spring member operatively connecting the plate member and the implement, the spring member biased to urge a second end of the implement away from the plate member; and
    a pin member adapted to engage the apertures of the tool bar assembly and at least one of the plurality of pairs of adjustment holes of the implement assembly, the relative angle between the tool bar assembly and the implement assembly being determined by the selection of the adjustment holes.

6. The quick connect/disconnect coupling as in claim 5, further including a limiting member to restrict movement of the second end of the implement away from the plate member.

7. The quick connect/disconnect coupling as in claim 5, the spring member being a torsion spring.

8. The quick connect/disconnect coupling as in claim 7, the torsion spring positioned about the first end of the implement.

* * * * *

UNITED STATES PATENT AND TRADEMARK OFFICE
CERTIFICATE OF CORRECTION

| | | |
|---|---|---|
| PATENT NO. | : 8,858,110 B2 | Page 1 of 1 |
| APPLICATION NO. | : 13/827625 | |
| DATED | : October 14, 2014 | |
| INVENTOR(S) | : Kenneth E. Shoup | |

It is certified that error appears in the above-identified patent and that said Letters Patent is hereby corrected as shown below:

In the Claims

Column 8, line 5, change "the toot bar assembly" to --the tool bar assembly--

Signed and Sealed this
Tenth Day of February, 2015

Michelle K. Lee
*Deputy Director of the United States Patent and Trademark Office*